Dec. 28, 1926.

W. E. AMBERG 1,611,981

GEAR MECHANISM

Filed March 23, 1922    2 Sheets-Sheet 1

Witness:
Geo. W. Hansen.

Inventor:
Walter E. Amberg.
By Jones, Addington, Ames & Seibold
Attys.

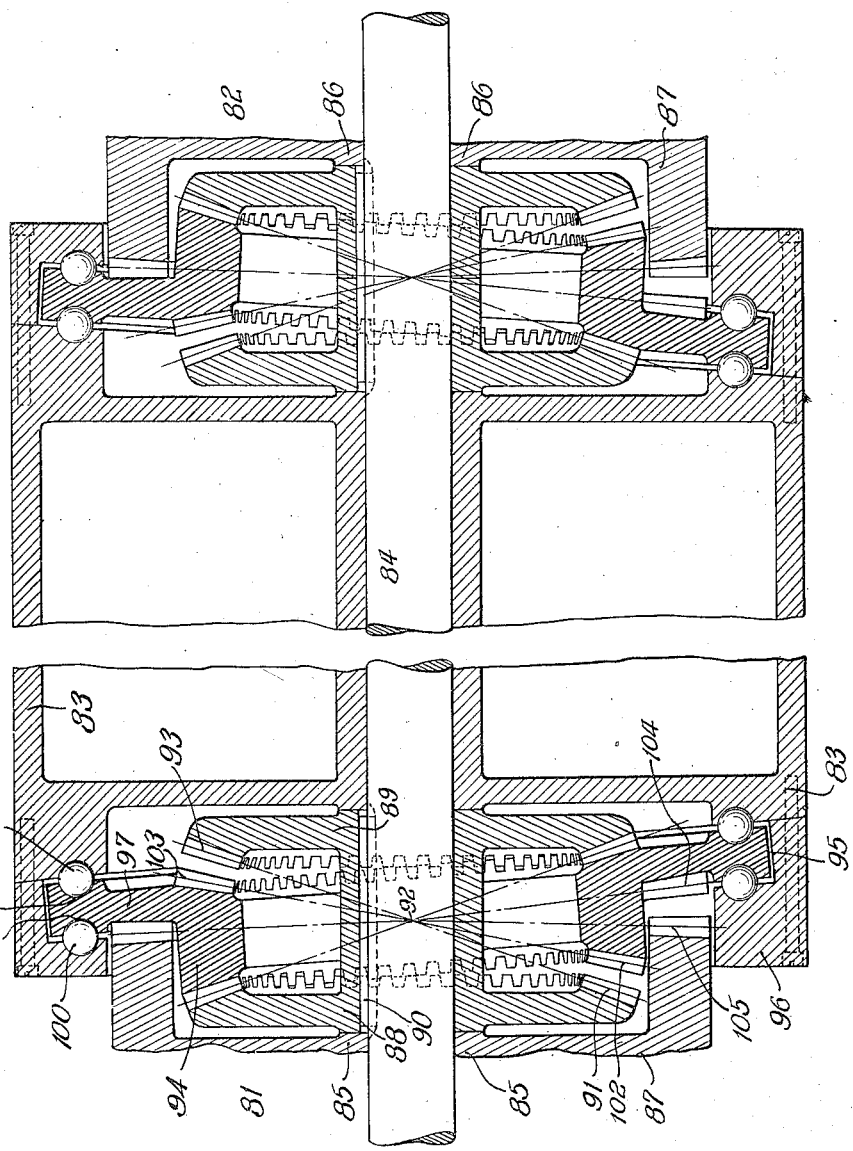

Patented Dec. 28, 1926.

1,611,981

UNITED STATES PATENT OFFICE.

WALTER E. AMBERG, OF CHICAGO, ILLINOIS, ASSIGNOR TO WILLIAM O. PETERSON AND BERNARD L. ENGELKE, BOTH OF CHICAGO, ILLINOIS.

GEAR MECHANISM.

Application filed March 23, 1922. Serial No. 545,921.

My invention relates in general to mechanisms comprising intermeshing gears and particularly to speed reduction means, and it has special reference to all such mechanisms embodying gear elements that are interlocking and, at the same time, may be adapted to attain very great speed reductions at high efficiency through the intermediary of a few intermeshing gears only.

More particularly, my invention refers to gearing mechanisms of the character indicated in which one of the intermeshing gear elements is a usual type of bevelled gear that is actuated to be conically oscillatory and may or may not be, as conditions of operation dictate, a rotatable gear while the associated gear may likewise be of the usual bevelled type of construction and stationary or rotatable, depending upon the character of the mechanism as well as the service demanded of my new invention.

One object of my invention is to provide a mechanism of the hereinbefore mentioned type which will be economical to construct and which will be efficient in operation and embody very few parts that are capable of being manufactured in quantity production and readily assembled into an operative mechanism.

Another object of my invention is to provide a speed reduction mechanism of the character outlined above which is capable of effecting very great reductions in speed and, at the same time, of transmitting very efficiently large quantities of power.

A further object of my invention is to provide a mechanism such as I have indicated in which the gear elements may comprise teeth of standard construction, such gear elements having the same tooth pitch and being of substantially the same diameter and, when in intermeshing relation with one another, are connected through a substantially large number of teeth thereby permitting of the efficient transmission of considerable quantities of power.

Further objects of my invention will hereinafter appear and be readily apparent from the description and the drawings forming a part of this specification to which reference may now be had for a more complete understanding of the characteristic features of my invention.

Fig. 3 is a cross-sectional view of another mechanism embodying a form of my invention in which a plurality of units are coordinated for neutralizing the unbalanced thrust upon the driven shaft.

Figure 2:
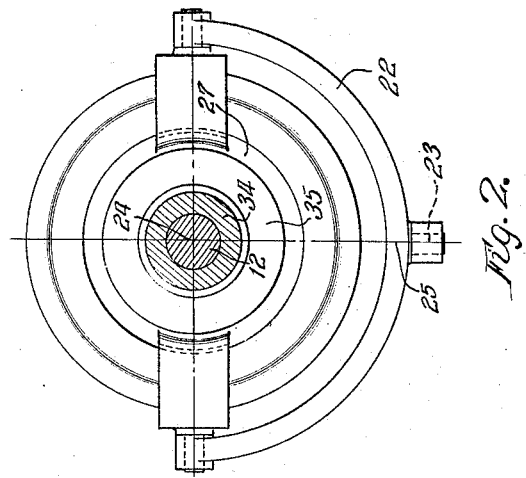
Fig. 2 is a view showing the application of a universal joint anchoring means to the double faced oscillatory gear element of Fig. 1.

While I refer herein to "oscillatory gears" and "conically oscillatory gears," it is to be understood that such gears are of the usual and common form of bevelled gear construction comprising standard gear teeth, and that the aforesaid designations refer to the motion of which the gears partake rendering the gears "oscillatory" or "conically oscillatory" and, when desired, rotatable or non-rotatable, as the designs of the various mechanisms require.

I am aware that it has been proposed to use conically oscillatory gears in speed reduction mechanisms wherein said oscillatory gear partakes of a planetary movement about an associated gear element but, in my present invention, there is no planetary movement required of the gears and, as a consequence, my device is practically noiseless. Again, I have provided means for anchoring the conically oscillatory gear concentrically about an apex that is common to the intermeshing gear elements comprised in my device and in which the driving force applied to, or the power delivered from, the gears is uniform. I have also devised means whereby the maximum range through which the conically oscillatory or wobbling gear may oscillate is minimized to a value that will just effect tooth clearance between the intermeshing gear elements. This is, of course, highly essential in commercial mechanisms embodying a form of my invention, since all vibration and jarring is thus minimized and, at the same time, permits of the intermeshing of a large number of gear teeth whereby large quantities of power may be exchanged with high efficiency between the intermeshed gears. The range of oscillation of which the conically oscillatory gear of my mechanism may partake is dependent upon the tooth pitch of the intermeshing gear elements and is slightly in excess of the height of the gear teeth thereby just affording clearance between the intermeshing gears. In other words, the common apex of the intermeshing bevelled gears is defined by reason of the tooth pitch of the gear elements. Again, in my mechanism, I may incorporate, if I desire, a novel form of gear anchoring means whereby the oscillatory gear is held concentrically of the common apex and the rotatable shaft in such a manner that, at all times, it is subjected to a uniformly applied force concentrically of said apex and shaft. By means of mechanisms embodying my present invention, I am able to effect an interlocking between a driving gear element and the driven gear element which permits of the driven gear element to be rotated in either direction depending upon the direction of rotation of the driving gear element, but which precludes the driven gear element, when impressed with a force tending to drive it, from reacting in such a manner as to tend to drive the initially driving gear element. This interlocking adapts mechanisms embodying my invention to many uses wherein brakes or other agencies are now employed to serve the purposes which I have just mentioned.

Since my invention is applicable to a very great variety of specific mechanisms, I have shown it applied to two devices only, but in these devices which I have described and illustrated I have endeavored to broadly classify the co-ordination of the various elements incorporated in my present invention so that any one skilled in the art may readily and conveniently construct various other modifications embodying the broad features of my invention.

Figure 1:
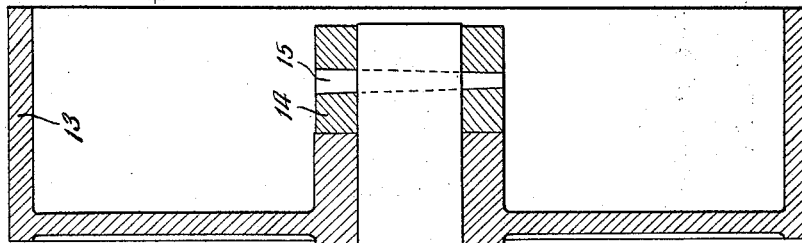
Fig. 1 is a view, partially in elevation and partially in section, of a mechanism of my invention and embodying a double conically oscillatory gear element that is adapted to intermesh with a second double gear element to effect a very great speed reduction.
Figure 1:
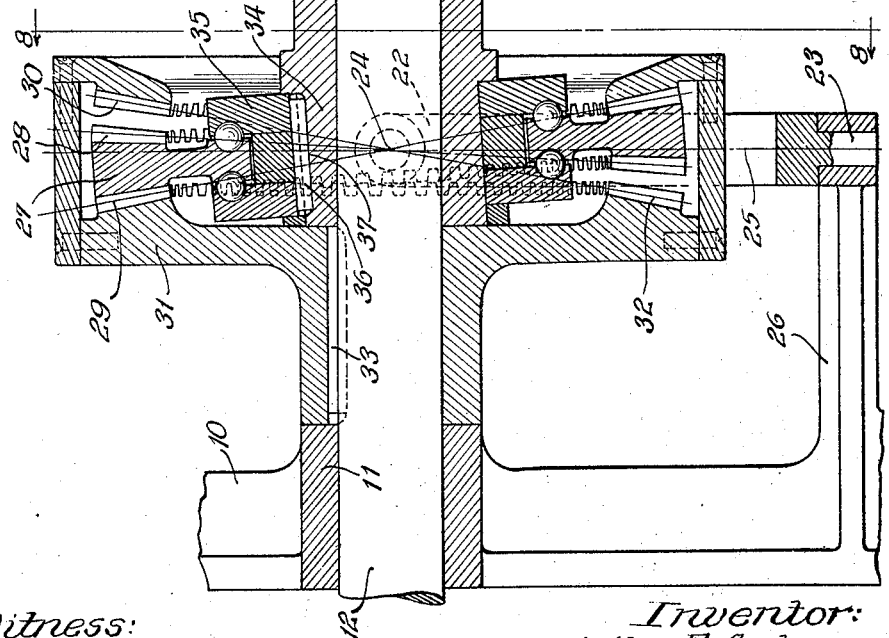

In Figs. 1 and 2 I have shown a wobbling gear element 27 which comprises gear teeth 28 formed on one of its faces and gear teeth 29 formed on the opposite one of its faces. The wobbling gear element 27 is anchored by means of a universal joint 22, the vertical axis of the universal joint being pivoted at 23 and the horizontal axis 24 coinciding with a common apex represented at 24 of the bevelled gears comprised in the mechanism. The gear teeth 28 constituting one set upon the wobbling gear 27 are adapted to mesh with gear teeth 30 formed on a gear element 31 and the gear teeth 29 of the wobbling gear 27 are adapted to mesh with gear teeth 32 formed on the gear element 31. The gear element 31, which comprises two spaced and opposed sets of bevelled teeth 30 and 32, is secured by a key 33 to the rotatable shaft 12 which is supported in the bearing 11 formed in the framework 10, as hereinbefore described.

The pulley 13 which is loosely mounted upon the shaft 12 and locked against longitudinal movement by means of the collar 14 is provided with a longitudinally extending sleeve 34 through which the shaft 12 extends and upon which is supported a housing 35 for a double roller bearing, said housing being secured to the sleeve 34 by means of a key 36. On rotating the pulley 13, an oscillating motion is imparted to the wobbling gear 27 which oscillates concentrically about the common apex indicated at 24. The apex 24 is common to the bevelled gear 29 and the bevelled gear 30 formed on the gear element 31, as well as to the bevelled teeth 28 and 29 formed on the wobbling gear element 27. The wobbling gear element 27 comprises in each of its sets of teeth 28 and 29, one tooth in excess of the number of teeth comprised in the co-acting sets of teeth 30 and 32 formed in the rotatable gear element 31. It will be observed from the foregoing that the wobbling gear element 27 comprises a double set of gear teeth which intermesh at diametrically opposite points with the co-acting sets of gear teeth 30 and 32 formed on the rotatable gear element 31. As a consequence, the longitudinal thrust imposed upon the wobbling gear element 27 by the rotation of the pulley 13 is balanced. Oscillatory movement is imparted to the wobbling gear element 27 through an off-set bearing 37 which is formed on the sleeve 34 and a slant of the axis of the shaft 12 so that the slope of its external surface will be perpendicular to a bi-secting plane passed between the pitch circles of the bevelled gear teeth 28 and 29. While the housing 35 for the ball bearings is mounted upon the bearing 37 and is keyed to the sleeve 34, the wobbling gear 27 is held against rotation by means of the universal joint 22 and, therefore, rotary motion is imparted to the rotatably mounted double gear element 31 which is keyed to the shaft 12. From the foregoing description, it will be noted that if the pulley 13 is rotated clockwise the double gear element 31 will be rotated counter-clockwise, this by reason of the fact that the intermeshing teeth formed on the co-acting wobbling gear 27 comprise in each set one tooth in excess of the correspondingly co-acting set of teeth formed upon the gear element 31. Again, because of the interlocking action between the gears 27 and 31, the shaft 12 cannot serve as a driving member for the pulley 13.

In the mechanism shown in Figs. 1 and 2 it will be noted that the wobbling gear 27 is provided with a double set of intermeshing gear teeth each set severally engaging a set on the co-acting gear element 31 thus balancing the longitudinal thrust; that the wobbling gear 27 is held against rotation through the agency of a universal joint anchorage; that each set of gear teeth on the wobbling gear 27 possesses a larger number of teeth than the co-acting set of teeth in the gear element 31; that the wobbling gear 27 is anchored concentrically about the apex 24 which is common to all of the sets of bevelled gear teeth formed on the wobbling gear element 27 and the gear element 31, and that the driving force applied to the wobbling gear element 27 through the pulley 13 is a radial thrust and, therefore, requires a ball bearing of the type illustrated at 35.

In Fig. 3 I have shown a mechanism comprising double units 81 and 82 which are positioned side by side and so coordinated that the driven shaft is entirely devoid of any longitudinal thrust. Each of the two units making up this speed reduction mechanism comprises a double faced wobbling gear element as will be hereinafter described. Since the two units 81 and 82 are substantially identical, I will describe in detail the construction of the left-hand unit 81 only.

A rotatable member 83 is loosely mounted upon a shaft 84 and serves as the driving element for the mechanism and, at the same time, as a housing for the two units 81 and 82. The shaft 84 is journaled in bearings 85 and 86 that are formed in a stationary frame 87, a portion only thereof being shown. A pair of similar and opposed gear elements 88 and 89 are severally keyed to the shaft 84 by means of a key 90. The gear element 88 is provided with a set of bevelled gear teeth 91 having their apex at 92 and, similarly, the gear element 89 is provided with a set of bevelled gear teeth 93 also having their apex at 92. A wobbling gear element 94 is placed intermediate the gear elements 88 and 89 and is supported externally by means of an annular bearing 95 formed in the driving member 83 to which an annular and flanged ring 96 is secured in any suitable fashion. The wobbling gear element 94 is provided with an annular lateral extension 97 which terminates in two oppositely disposed bearing surfaces 98 and 99 upon which ball bearings 100 and 101, respectively, are adapted to ride. The ball bearings 100 and 101 are thus interposed between the wobbling gear element 94 and the supporting driving member 83.

The annular bearing 95, which supports the wobbling gear element 93, is provided with inclined bearing surfaces which are so designed that the wobbling gear element 94 will have imparted to it the proper conically oscillatory motion as hereinbefore described. The wobbling gear element 94 is provided with two sets of oppositely disposed bevelled gear teeth 102 and 103, likewise having the common apex 92, the set of gear teeth 102 being adapted to intermesh with the set of gear teeth 91 and the set of gear teeth 103 being adapted to intermesh with the set of gear teeth 93. It is to be observed that the set of gear teeth 102 engages with the set of gear teeth 91 at points diametrically opposite to the points of engagement between the set of gear teeth 103 and the set of gear teeth 93. In this manner, any longitudinal thrust resulting from the intermeshing of the oscillatory gear element 94 with the co-acting gear elements 88 and 89 will be counter balanced.

The bevelled gear teeth 91, 93, 102 and 103 have the common apex 92 about which they are concentrically disposed and the annular lateral extension 97, formed on the wobbling gear element 94, is also provided with bevelled gear teeth 104 which have the point 92 as their common apex. The bevelled gear teeth 104 are adapted to intermesh with co-acting stationary bevelled teeth 105 which are formed on the frame 87 and also have the common apex 92. The gear teeth 104 and 105 constitute the external gear anchorage means for the wobbling gear 94. The proper oscillatory motion is imparted to the wobbling gear element 94 by driving the element 83. The wobbling gear element 94 is permitted to conically oscillate freely about the apex 92 but is held against rotation by reason of the gear anchorage comprising the sets of bevelled gear teeth 104 and 105, each having the same number of gear teeth. The wobbling gear element 94 intermeshes with the gear elements 88 and 89 which, in turn, are keyed to the shaft 84 and thus impart rotary motion thereto. The sets of teeth formed on the wobbling gear element 94 severally comprise one tooth in excess of the co-acting sets of gear teeth formed on the two gear elements 88 and 89 and, therefore, the shaft 84 is rotated in a direction opposite to the direction of the driving force applied to the driving member 83.

Since the unit 82 is similar in all respects to the unit 81, excepting that the unit 82 is placed back to back to the unit 81, I will not describe this second unit. By reason of this co-ordination of the units 81 and 82 all longitudinal thrust that tends to develop in these two units and to be imposed upon the shaft 84 is completely neutralized and thus removed from the shaft 84.

In the mechanism shown in Fig. 3, it will be apparent that each unit 81 and 82 comprises a double-faced wobbling gear which is anchored through a gear anchorage mechanism that is external of the co-acting speed reducing gears. The wobbling gear element 94 is held against rotation while the gear elements 88 and 89 are permitted to rotate and, therefore, to impart rotary movement to the driven shaft 84. Moreover, the wobbling gear element 94 comprises sets of bevelled gear teeth which have one tooth in excess of the teeth comprised in the sets of gear teeth which are adapted to co-act therewith. The longitudinal thrust developed in the unit 81 is neutralized by reason of the two opposed thrust bearings 100 and 101.

While I have shown and described modifications of mechanisms embodying different forms of my invention, it will be apparent to one skilled in the art that numerous other modifications may be arranged which may comprise various features that I have pointed out in the devices which I have illustrated and described. These various permutations and combinations will, of course, be within the scope of my invention, and, because of the many modifications which may be made but which will be comprehended in the foregoing descriptions, I have deemed it not desirable to illustrate and describe each and every such modification, but I desire that only such limitations be imposed on my invention as are set forth in the appended claims.

What I now claim as new and desire to secure by Letters Patent of the United States is:

1. A one-way interlocking mechanism comprising two spaced and opposed bevelled gears having a common apex, two bevelled gears having the same common apex interposed between said first gears and being severally associated therewith in intermeshing relation to constitute two pairs of intermeshing gears, said second gears being conically oscillatory about said common apex, a rotatable shaft encircled by all of said gears, means for anchoring said second gears concentrically about said common apex and for holding said second gears against rotation, said anchoring means effecting engagement at diametrical points between said two pairs of intermeshing gears, and means for imparting conically oscillatory motion in unison to said second bevelled gears thereby imparting rotary motion to said rotatable shaft.

2. A one-way interlocking mechanism comprising two spaced and opposed bevelled gears having the same number of teeth and a common apex, two bevelled gears having the same number of teeth and the same common apex interposed between said first gears and being severally associated therewith in intermeshing relation to constitute two pairs of intermeshing gears, said second gears being conically oscillatory about said common apex, a rotatable shaft encircled by said gears, means for anchoring said second gears concentrically about said common apex and said shaft whereby engagement may be effected between the intermeshing gears of said two pairs at diametrical points, and means for imparting conically oscillatory movements in unison to said second bevelled gears which are held against rotation by said anchoring means thereby imparting rotary motion to said shaft.

3. A one-way interlocking mechanism comprising two spaced and opposed bevelled gears having the same number of teeth and a common apex, two bevelled gears having the same number of teeth and said common apex and being severally associated with said first gears in intermeshing relation to constitute two pairs of intermeshing gears, said second gears being differentiated from said first gears each by one tooth, said gears being conically oscillatory about said common apex, means for anchoring said gears concentrically about said common apex and for holding them against rotation, said anchoring means effecting engagement between the gears of each pair at diametrical points, a rotatable shaft encircled by said gears, and means for imparting conically oscillatory movements in unison to said second bevelled gears in order to impart rotary motion to said shaft.

4. A one-way interlocking mechanism comprising two spaced and opposed bevelled gears having the same number of teeth and a common apex, two bevelled gears interposed between said first gears having the same number of teeth and said common apex, said second gears being severally associated in intermeshing relation with said first gears to constitute two pairs of intermeshing gears and said second gears being conically oscillatory about said common apex, a rotatable shaft encircled by said gears, gear anchorage means for anchoring said second gears concentrically about said common apex and for holding said second gears against rotation, said gear anchorage effecting engagement between the gears of said two pairs at diametrical points in order to balance the longitudinal thrust that may be imposed on said shaft, and driving means for imparting conically oscillatory movements in unison to said second bevelled gears in order that said driven shaft may partake of a rotary motion.

5. In a mechanical movement, a shaft, and a speed reducing mechanism thereon and operatively connected thereto, said mechanism comprising an annular and conically oscillatory wheel having beveled gears on its opposite faces, means engaging said gear adjacent the periphery thereof for oscillating said gear, and a double gear member fixed to said shaft and encircled by said oscillatory wheel and having gears epicyclic with the gears on the opposite faces of said oscillatory wheel.

6. In a mechanical movement, a shaft, and a speed reducing mechanism thereon and operatively connected thereto, said mechanism comprising an annular and conically oscillatory wheel having beveled gears on its opposite faces, means engaging said gear adjacent the periphery thereof for oscillating said gear, a double gear member fixed to said shaft and encircled by said oscillatory wheel and having gears epicyclic with the gears on the opposite faces of said oscillatory wheel, and means for anchoring said oscillatory wheel against rotation comprising epicyclic gearing concentric with said shaft and arranged between said beveled gears and said means for oscillating said oscillatory wheel.

7. In a mechanical movement, a shaft, a pair of speed reducing mechanisms in tandem thereon for rotating said shaft, said mechanisms severally comprising oscillatory epicyclic wheels, and common means for oscillating said wheels, said wheels being oscillatory in opposite phase whereby thrusts therefrom may be neutralized in said means.

8. In a mechanical movement, a shaft, a pair of speed reducing mechanisms in tandem thereon for rotating said shaft, said mechanisms severally comprising oscillatory epicyclic wheels, and common means rotatably mounted upon and concentric with said shaft for conically oscillating said wheels in opposite phase whereby thrusts therefrom may be neutralized in said means.

9. In a mechanical movement, a shaft and a pair of speed reducing mechanisms thereon in tandem and operatively connected thereto, each of said mechanisms comprising the following: an annular and conically oscillatory wheel having beveled gears on its opposite faces, means common to both of said pair of mechanisms for engaging said gears adjacent the peripheries thereof for oscillating said gears in opposite phase, a double gear member fixed to said shaft and encircled by said oscillatory wheel and having gears epicyclic with the gears on the opposite faces of said oscillatory wheel, and means for anchoring said oscillatory wheel against rotation comprising epicyclic gearing concentric with said shaft and arranged between said beveled gears and said means for oscillating said oscillatory wheel.

10. In a mechanical movement, a shaft and a speed reducing mechanism thereon and operatively connected thereto, said mechanism comprising a pair of epicyclic gears conically oscillatory in opposite phase, means for anchoring said gears against rotation and means for oscillating said gears in opposite phase, whereby substantially complete compensation is effected for all thrusts of said gears except rotational forces on said shaft.

In witness whereof, I have hereunto subscribed my name.

WALTER E. AMBERG.